May 29, 1962 M. BERCHTOLD 3,036,561
TWO CYCLE ENGINE SUPERCHARGER ARRANGEMENT AND CONTROL
Filed Oct. 26, 1959 2 Sheets-Sheet 1
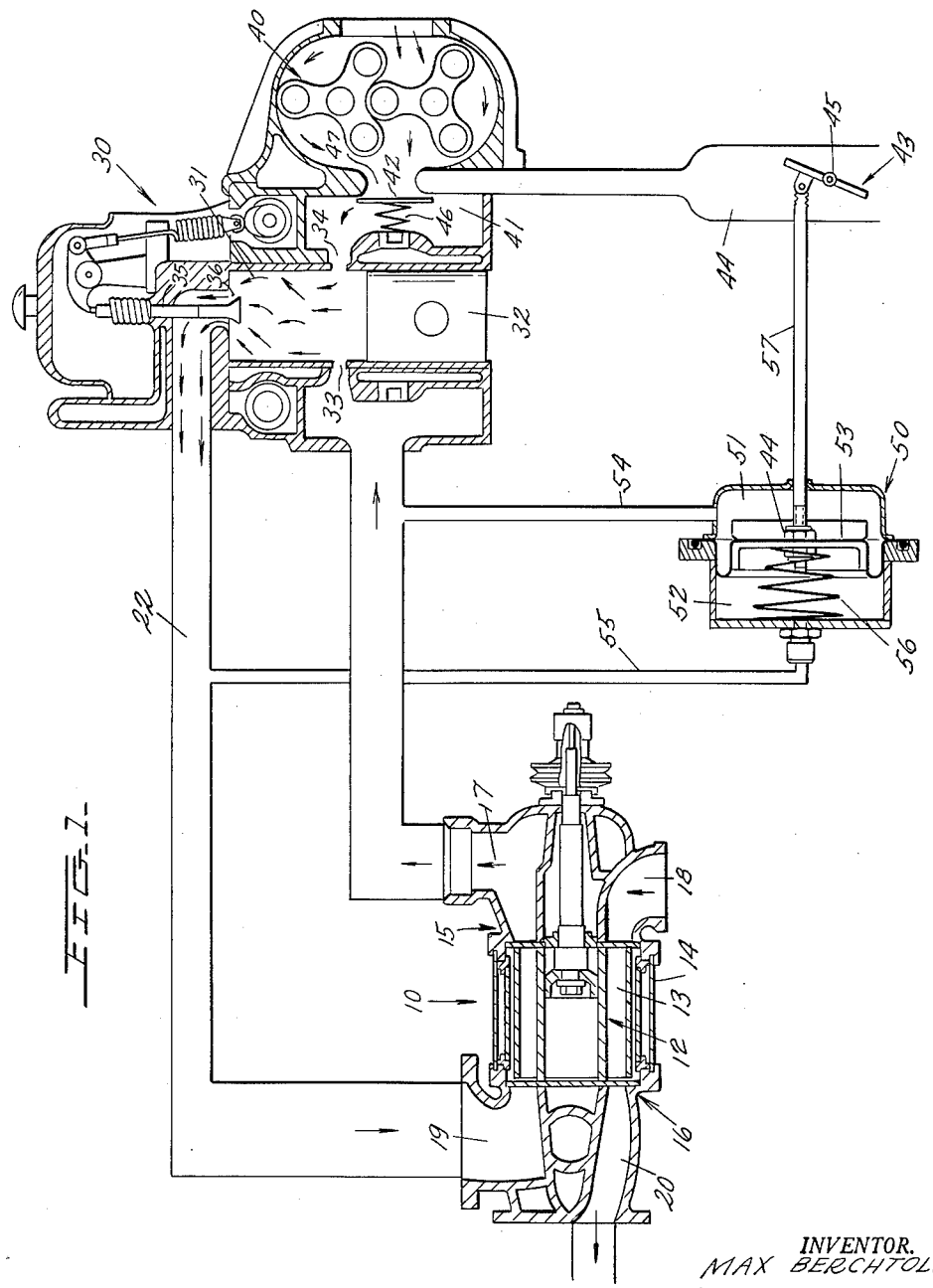
INVENTOR.
MAX BERCHTOLD
BY
ATTORNEYS

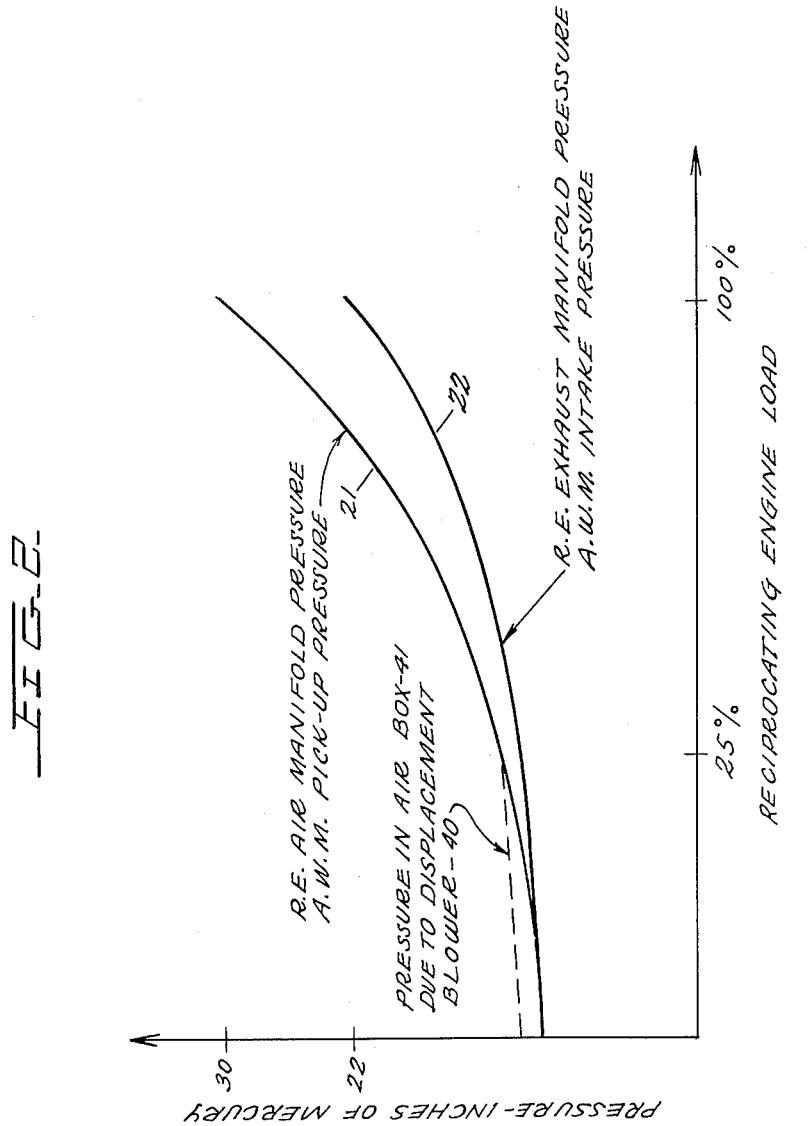

3,036,561
TWO CYCLE ENGINE SUPERCHARGER ARRANGEMENT AND CONTROL

Max Berchtold, Paoli, Pa., assignor to I-T-E Circuit Breaker Company, Philadelphia, Pa., a corporation of Pennsylvania
Filed Oct. 26, 1959, Ser. No. 848,755
11 Claims. (Cl. 123—65)

My invention relates to the combination of a two cycle reciprocating engine supercharged by both an aerodynamic wave machine and a small displacement blower connected in parallel and more particularly is directed to a novel supercharging arrangement for two cycle reciprocating engines comprising a parallel combination of an aerodynamic wave machine and a displacement blower with control means to render the displacement blower ineffective when not needed.

With my novel arrangement, a parallel connected small displacement blower is effectively connected to the system during low load and idling conditions so that the mass flow delivery of compressed air to the reciprocating engine never falls below the requirements of the two cycle reciprocating engine. Thus, my invention represents an improvement that could be added to the aerodynamic wave machine supercharging arrangement of copending application Serial No. 458,771 filed September 28, 1954, entitled "Aerodynamic Wave Machine for Reciprocating Engine" in the name of Max Berchtold and assigned to the assignee of the instant application and issued on October 25, 1960, as U.S. Patent 2,957,304.

Prior art constructions of turbo-supercharged two cycle engines have had supplemental mechanically driven blowers, but these blowers actually supply air flow to the reciprocating engine during all load conditions. That is, the blower is operative during full load conditions even when it may not be needed. Thus, with this arrangement, there is usually a considerable amount of energy absorbed by the blower and hence the gains achieved by supercharging are substantially reduced.

Another prior art construction for supercharging reciprocating engines is with an aerodynamic wave machine or pressure exchanger, such as shown in U.S. Patent No. 2,853,987 issued September 30, 1958, entitled "Diesel Engine Supercharged by the Aerodynamic Wave Machine" to Max Berchtold et al. and assigned to the assignee of the instant invention. However, this prior art illustration is primarily directed to a four cycle engine. In fact, this arrangement would only operate efficiently for a two cycle engine if a full capacity blower is used. This arrangement furthermore has the disadvantage that more power is required to drive the blower.

The instant invention consists of two cycle engine supercharger arrangement consisting of a parallel combination of a pressure exchanger and a small mechanically driven displacement blower whereby the displacement blower is effective only during idling and low load conditions of the two cycle engine. At high load, the blower is not effective and in fact absorbs little or no power.

The parallel combination of pressure exchanger and a two cycle reciprocating engine will operate effectively as long as the pressure at the air manifold or pick-up port exceeds the pressure in the exhaust manifold or intake port, even though the temperature at the pressure exchanger hot intake port is below minimum operating temperatures. This condition requires that the mass flow of the expanding gas at the pressure exchanger intake port exceeds the mass flow of the air to be supplied to the two cycle engine. The difference is the air being compressed in the auxiliary displacement blower and supplied to the reciprocating engine.

Thus, during low load and idling conditions, the parallel connected displacement blower is effective to maintain the necessary pressure differential between the air intake manifold and the exhaust manifold to insure the required scavenging of the reciprocating engine.

In the prior art arrangements for pressure exchanger supercharged four cycle engines, the pressure exchanger cannot automatically supply the mass flow of air demanded by the reciprocating engine during low load and idling conditions hence, the four cycle reciprocating engine will merely asperate the additional air directly through the pressure exchanger. Thus, hot contaminated gas will be pulled through the pressure exchanger directly to air manifold and hence, the reciprocating engine will eventually stall when its cylinders fill up with hot contaminated gas. This problem can be solved in a four cycle engine by providing the pressure exchanger with a bypass throttle valve such as illustrated, described and claimed in the above noted U.S. Patent No. 2,853,987.

Although this by-pass and throttle valve arrangement is adaptable for a four cycle engine, it cannot solve the same problem for a two cycle engine. That is, the four cycle engine, even under low load and idling conditions, will have natural asperation whereas the two cycle engine must be forced scavenged from external means under all load operating conditions.

A two cycle reciprocating engine operated under idling or low conditions has extremely low exhaust temperatures and pressures. Since this represents the input to the pressure exchanger, its output pressure and air flow to the air manifold will be very low.

Thus, there will not be a sufficient pressure differential between the air intake manifold and the exhaust manifold to provide the necessary scavenging for the two cycle reciprocating engine. To this end, it is necessary to provide a displacement blower which can be operative during low load and idling conditions to provide the necessary air flow, which mixed with the air compressed in the pressure exchanger, will provide the scavenging of the two cycle engine at low engine loads.

It is noted that under full load conditions as well as all other load conditions between approximately 25 and 100% of maximum load that the pressure exchanger or aerodynamic wave machine can furnish a sufficient air flow at a sufficiently high pressure to the reciprocating engine to maintain proper operation without requiring any air flow contribution from the displacement blower. Hence, it would be desirable to provide an arrangement whereby the displacement blower is operative only during the low load and idling conditions and not operative during other load conditions.

My invention is specifically directed to a novel supercharging arrangement wherein a pressure exchanger and a displacement blower are connected in parallel with means provided to not only prevent the output of the displacement blower from entering the two cycle reciprocating engine during 25% to 100% load conditions, but also prevents the displacement blower from unnecessarily absorbing shaft output or energy from the reciprocating engine during these load conditions.

This is achieved by providing a waste-gate in a duct between the displacement blower and the check valve to the air box of the two cycle engine, so that the waste-gate is opened when there is a large pressure differential between the air manifold and exhaust manifold. This results in the output of the displacement blower being discharged at ambient pressure. Since tthe blower does not have to produce pressure, there is little or no load on the displacement blower and it will absorb very litle power.

Accordingly, a primary object of my invention is to provide an arrangement in which a two cycle reciprocating engine is supercharged by the parallel combination of a pressure exchanger and a displacement blower, whereby the displacement blower aids the pressure exchanger and absorbs power only during low load and idling conditions.

Another object of my invention is to provide a novel supercharging arrangement for two cycle reciprocating engines whereby the necessary pressure differential between the air intake manifold and the exhaust manifold is always maintained at a minimum expenditure of energy.

Another object of my invention is to provide a parallel combination of a pressure exchanger and a displacement blower in which pressure differential sensing means are effective to render the displacement blower ineffective during load conditions in which its output is not needed so that the blower will not absorb unnecessary energy from the system.

These and other objects of my invention will be apparent when taken from the following description in connection with the drawings, in which:

FIGURE 1 is an illustration of my novel invention showing the displacement blower connected in parallel with a pressure exchanger for the purpose of both scavenging and supercharging the two cycle engine.

FIGURE 2 is a typical chart of pressure versus load showing the manifold differential pressure conditions obtained by the displacement blower and the control means.

In FIGURE 1, I have shown an aerodynamic wave machine or pressure exchanger 10 which is connected in parallel with the displacement blower 40 for the purpose of scavenging and supercharging the two cycle reciprocating engine 30.

The aerodynamic wave machine or pressure exchanger 10 may be of any desirable construction as, for example, as shown in U.S. Patent 2,970,745 to Max Berchtold and assigned to the assignee of the instant application, and the supercharging connections may be as illustrated in the aforementioned U.S. Patent 2,957,304.

The pressure exchanger 10 has a rotor 12 having a plurality of channels 13 positioned within the housing 14 and straddled by stator plates 15 and 16. Appropriate openings are placed in the stators 15 and 16 to provide for the necessary flow of fluid into and out of the pressure exchanger 10. Thus, for example, the stator 15 is provided with pick-up port (high pressure cold outlet) 17 and cool air intake port (low pressure cold inlet) 18, and the stator plate 16 has a hot inlet nozzle (high pressure inlet) 19 and an exhaust port (low pressure hot outlet) 20.

The pick-up port 17 is connected to the cylinder 31 of the two cycle reciprocating engine 30 by means of the air intake manifold 21 and the exhaust from the reciprocating engine cylinder 31 is supplied to the hot nozzle 19 by means of the exhaust manifold 22. Thus, hot high pressure fluid exhausted from the reciprocating engine 30 is supplied through the exhaust manifold 22 to the inlet nozzle 19 of the wave machine 10 and simultaneously cool low pressure air is supplied to the wave machine 10 through the inlet port 18.

Within the wave machine 10, there is an exchange of pressure between the hot high pressure fluid and cool low pressure air, so that hot high pressure fluid which enters nozzle 19 is exhausted through the exhaust port 20 at a low pressure, and the low pressure clean air which enters the wave machine 10 at inlet port 18 is delivered by the wave machine through the pick-up port 17 at high pressure.

Thus, the pressure exchanger 10 is able to supply high pressure, clean air through the pick-up port 17 to the air intake manifold 21 by utilizing the energy of the hot gases exhausted from the reciprocating engine 30 to the exhaust manifold 22.

Although the general arrangement of utilizing an aerodynamic wave machine as a supercharge for reciprocating engines has been found to have many advantages over a turbine-compressor combination, it has also been found that problems exist during idling and low load operations of two cycle engines. Since there is insufficient energy available, the necessary pressure cannot be maintained at low load to provide scavenging of the engine, thereby resulting in starving and possible stalling of the reciprocating engine.

If the wave machine 10 is to supercharge a four cycle reciprocating engine, it is possible to bypass the wave machine during low load and idling conditions so that the reciprocating engine aspirates fresh air from the ambient. This is the arrangement generally disclosed in the aforementioned U.S. Patent No. 2,853,987. However, this arrangement cannot be used with a two cycle engine since the reciprocating engine without a blower is unable to draw in fresh air. A small blower is therefore needed to assist the aerodynamic wave machine 10 during starting and low load operation.

Thus, my invention is specifically directed to the supercharging and scavenging of a two cycle engine 30 by the parallel combination of the wave machine 10 and the displacement blower 40.

The operation of the two cycle engine 30 is as follows: In the position of FIGURE 1, the piston 32 is on its upward stroke and both the exhaust valve 36 of the intake ports 33—34 are open. Hence, fresh compressed air enters the cylinder 31 from the air box 41 to scavenge the exhaust gas out through port 36 past open valve 36. As the piston 32 moves up, it closes the exhaust valve 35 and thereafter closes the intake ports 33—34. Continued upward movements of the piston 32 compresses the air further. At the end of its upwards stroke, the fuel in the combustion chamber 31 is ignited driving the piston 32 downward. During the work stroke, the exhaust port 36 is first opened by valve 35 and thereafter the air intake ports 33—34 are opened by the piston 32.

The cylinder 31 of the reciprocating engine 30 is supplied with compressed air from the aerodynamic wave machine 10. Under low load conditions, additional compressed air is supplied by the mechanically driven displacement blower 40 through the second air intake manifold 47 to air box 41. The check valve 42 is designed to open the intake manifold 47 to the air box 41 when the pressure in the blower 40 exceeds the pressure in the air box 41. Thus, the check valve will open, thereby permitting air to flow from the displacement blower 40, through the check valve 42 into the air box 41. The check valve 42 is biased closed by spring 46 and hence the valve 42 will remain closed until the pressure in manifold 47 exceeds the pressure in air box 41 to thereby overcome the closing force of spring 46 and hence force check valve 47 to open.

The wave machine 10 continuously supplies compressed air to the air box 41 from its pick-up port 17 through the air intake manifold 21. Thus, the mechanically driven displacement blower 40 is in effect connected in parallel with the wave machine 10, so that under certain conditions, both of the devices supply compressed air to the reciprocating engine 30.

A throttle valve or waste-gate 43 is connected to the blower 40 on the discharge side. This waste-gate or throttle valve 43 is controlled by the actuator 50 which in turn is operated by the differential pressure of the air manifold 21 and exhaust manifold 22. That is, when the differential pressure is high, the throttle valve 43 will be opened by actuator 50, such as seen in FIGURE 1, and when the differential pressure is low, a throttle valve 43 will be closed by actuator 50.

The actuator 50 which is comprised of a first compartment 51 and a second compartment 52, separated by a diaphragm 53. The compartment 51 is connected by means of the tube 54 directly to the air intake manifold 21 and the compartment 52 is connected by means of the tube 55 directly to the exhaust manifold 22.

A spring member 56 is positioned in the chamber 52 co-axially with the shaft of the driving rod 57 which is connected to diaphragm 53.

When the two cycle reciprocating engine 30 is operated under substantially full load conditions, the exhaust gas into the exhaust manifold 22 will be relatively hot, thereby having a large energy input to the wave machine 10 resulting in a relatively high pressure output at the pick-up 17 and thus, into the air intake manifold 21. This will result in a desirable large pressure differential between the air manifold 21 and the exhaust manifold 22, such as seen in FIGURE 2. Under these conditions, the pressure differential between chamber 51 and 52 will be sufficient to overcome the force of the spring 56, thereby maintaining the driving rod 57 in its neutral left position. That is the waste-gate 43 will be held on its pivot 45 in the extreme counter-clockwise or open position, as seen in FIGURE 1.

Thus, the mechanically driven displacement blower 40 will discharge its output at essentially ambient pressure through the exhaust port 44 past waste-gate 43. The blower pressure in the connecting means 47 being below the pressure of air box 41 causes spring 46 to close the check valve 42.

Since the blower 40 discharges at practically ambient pressure, the displacement blower 40 will not absorb power. This condition will exist for all load operating conditions of the reciprocating engine from 100% load down to approximately 25% load.

As seen in FIGURE 2, the pressure differential between the air manifold 21 and the exhaust manifold 22 is sufficiently large for all load conditions between 25% and 100% load to maintain the waste-gate or throttle valve 43 in the open position. However, when the reciprocating engine is operated below 25% load, the pressure differential between the air manifold 21 and the exhaust manifold 22 drops so as to be insufficient to overcome the force of the spring 56 within the actuator 50, thereby resulting in the movement of diaphragm 53 to the right, hence forcing the actuator rod 57 to rotate the throttle valve 43 clockwise about its pivot 45 to closed position. Thus, the exhaust port means 44 will be closed by the throttle valve 43 thereby permitting the mechanically driven displacement blower 40 to build up pressure capable to open the check valve 42 when the pressure exceeds the pressure within the air box 41. The displacement blower 40 will supply compressed air to the air box 41 in parallel with the supply of air from the wave machine 10. This condition will be maintained all during idling and low load conditions, so that the pressure in the air box 41, as seen by the dotted line of FIGURE 2, will be higher than the pressure in the exhaust manifold 22, so that the necessary scavenging and supercharging will take place during these conditions.

It will be noted, of course, that the reverse operation will occur as the load builds to a larger value. That is, as the load on a reciprocating engine 30 exceeds 25%, the temperature in the exhaust manifold 22 will increase, thereby increasing the input to the wave machine 10 and accordingly, increase the pressure output at the pick-up port 17 of the wave machine.

Therefore, there will be an increase in the pressure at the intake manifold 21, as seen in FIGURE 2, and the pressure differential between the manifolds 21 and 22 will be sufficiently large to overcome or neutralize the force of the spring 56, thereby bringing the driving rod 57 back to its neutral left position and hence rotating the throttle valve 43 around its pivot 45 to the open position such as seen in FIGURE 1.

Under these conditions, the output of the blower 40 will be bled-off at ambient pressure and the check valve 42 will again close. The power absorbed by the displacement blower 40 will be substantially zero since it will be operated under practically no load.

In FIGURE 1, I have shown that the preferred embodiment of my invention whereby the two chambers 51, 52 of the actuator 50 are maintained respectively at the pressures of the air manifold 21 and exhaust manifold 22.

However, since the actuator 50 operates on the principle of pressure differential, it will be apparent to those skilled in the art that it is possible to modify the construction illustrated by increasing the force of the spring 56 and having the chamber 52 at ambient pressure.

Thus, under conditions of 25% to 100% load, the pressure in the air manifold will be sufficient, by itself, to neutralize the force of the spring 56 to thereby hold the actuator bar 57, in its neutral position and the throttle valve 43 open, such as seen in FIGURE 1. Thus, with this second embodiment of my invention, it will not be necessary for the actuator 50 to have the sensing means 55 to determine the pressure within the exhaust manifold 22.

In the preferred embodiment of my invention, it is contemplated that the construction will be such that the spring actuated waste-gate 43 will either be fully open or fully closed. However, it should be noted that there may be conditions under which it would be desirable to have a gradual movement of the waste-gate 43 between its fully opened and fully closed positions.

Although I have described the preferred embodiments of my novel invention, many modifications and variations will be apparent to those skilled in the art. I prefer therefore to be limited not by the specific disclosure herein, but only by the appended claims.

I claim:

1. The combination of a two cycle reciprocating engine being scavenged and supercharged by a pressure exchanger and a mechanically driven displacement blower, said wave machine having a nozzle port and a pick-up port, said two cycle reciprocating engine being connected to an intake manifold and an exhaust manifold, said pick-up port being connected to said intake manifold and said exhaust manifold being connected to said nozzle port, said pressure exchanger being constructed to supply compressed air directly from said pick-up port through said air manifold to said two cycle reciprocating engine, exhaust gases from said reciprocating engine being supplied directly through said exhaust manifold to said nozzle port of said pressure exchanger, said mechanically driven displacement blower having its output connected directly to said two cycle reciprocating engine so that said displacement blower and said pressure exchanger are connected in parallel with each other, an exhaust duct positioned between the output of said displacement blower and said reciprocating engine, said exhaust duct having a throttle valve to connect and disconnect the output of said displacement blower to ambient air, and an actuator means to control said throttle valve.

2. The combination of a two cycle reciprocating engine being scavenged and supercharged by an aerodynamic wave machine and a mechanically driven displacement blower, said wave machine having a nozzle port and a pick-up port, said two cycle reciprocating engine being connected to an intake manifold and exhaust manifold, said pick-up port being connected to said intake manifold and said exhaust manifold being connected to said nozzle port, said wave machine being constructed to supply compressed air directly from said pick-up port through said air manifold to said two cycle reciprocating engine, exhaust gases from said reciprocating engine being supplied directly through said exhaust manifold to said nozzle port of said aerodynamic wave machine, said mechanically driven displacement blower having its output connected directly to said two cycle reciprocating engine so that said displacement blower and said aerodynamic wave machine are connected in parallel with each other, an exhaust duct positioned between the output of said displacement blower and said reciprocating engine, said exhaust duct having a throttle valve to connect and disconnect the output of said displacement blower to ambient air, and an actuator means to control said throttle valve, said actuator means effective to sense the pressure differential between said air manifold and said exhaust manifold.

3. The combination of a two cycle reciprocating engine being scavenged and supercharged by an aerodynamic wave machine and a mechanically driven displacement blower, said wave machine having a nozzle port and a pick-up port, said two cycle reciprocating engine being connected to an intake manifold and an exhaust manifold, said pick-up port being connected to said intake manifold and said exhaust manifold being connected to said nozzle port, said wave machine being constructed to supply compressed air directly from said pick-up port through said air manifold to said two cycle reciprocating engine, exhaust gases from said reciprocating engine being supplied directly through said exhaust manifold to said nozzle port of said aerodynamic wave machine, said mechanically driven displacement blower having its output connected directly to said two cycle reciprocating engine so that said displacement blower and said aerodynamic wave machine are connected in parallel with each other, an exhaust duct positioned between the output of said displacement blower and said reciprocating engine, said exhaust duct having a throttle valve to connect and disconnect the output of said displacement blower to ambient air, and an actuator means to control said throttle valve; said actuator having spring means connected to said throttle valve, said spring means being controlled by the magnitude of pressure in said air manifold.

4. The combination of a two cycle reciprocating engine being scavenged and supercharged by an aerodynamic wave machine and a mechanically driven displacement blower, said wave machine having a nozzle port and a pick-up port, said two cycle reciprocating engine being connected to an intake manifold and an exhaust manifold, said pick-up port being connected to said intake manifold and said exhaust manifold being connected to said nozzle port, said wave machine being constructed to supply compressed air directly from said pick-up port through said air manifold to said two cycle reciprocating engine, exhaust gases from said reciprocating engine being supplied directly through said exhaust manifold to said nozzle port of said aerodynamic wave machine, said mechanically driven displacement blower having its output connected directly to said two cycle reciprocating engine so that said displacement blower and said aerodynamic wave machine are connected in parallel with each other, an exhaust duct positioned between the output of said displacement blower and said reciprocating engine, said exhaust duct having a throttle valve to connect and disconnect the output of said displacement blower to ambient air, and an actuator means to control said throttle valve, said actuator being comprised of a first and second compartment separated by a diaphragm, said first compartment being connected to and being at the pressure of said intake manifold, a spring position in said second compartment, a driving rod having one end connected to said throttle valve and its other end connected to said diaphragm, said spring being effective to move said driving rod and said throttle valve to the closed position when the pressure in said air manifold drops due to low load or idling conditions.

5. A two cycle reciprocating engine being scavenged and supercharged by a parallel combination of a pressure exchanger and a displacement blower, the output of both said pressure exchanger and said displacement blower being positioned and constructed to supply compressed air directly to said two cycle reciprocating engine, means to selectively direct the output of said displacement blower between the reciprocating engine and ambient air, said means sensing the load conditions of the reciprocating engine and operatively connected through valve means, whereby said displacement blower supplies air directly to said reciprocating engine during low load conditions and supplies air directly to the ambient during full load conditions, said means being connected between an input and exhaust port or said reciprocating engine.

6. A two cycle reciprocating engine being scavenged and supercharged by a parallel combination of an aerodynamic wave machine and a displacement blower, means to selectively direct the output of said displacement blower between the reciprocating engine and ambient air; said reciprocating engine having an intake manifold; said means being comprised of an actuator controlled by the pressure at said intake manifold of said reciprocating engine, said actuator effective to force the entire output of said displacement blower into said reciprocating engine during low load conditions and to divert the entire output of said blower to the ambient air during full load conditions.

7. A two cycle reciprocating engine being scavenged and supercharged by a parallel combination of an aerodynamic wave machine and a displacement blower, means to selectively direct the output of said displacement blower between the reciprocating engine and ambient air; said reciprocating engine having an intake manifold; said means being comprised of an actuator controlled by the pressure at said intake manifold of said reciprocating engine, said actuator effective to force the entire output of said displacement blower into said reciprocating engine during low load conditions and to divert the entire output of said blower to the ambient air during full load conditions; said actuator operatively constructed to selectively control the output of said blower by means of a throttle valve, said throttle valve being positioned in an exhaust duct positioned between the output of said blower and said reciprocating engine.

8. A two cycle reciprocating engine being scavenged and supercharged by a parallel combination of an aerodynamic wave machine and a displacement blower, means to selectively direct the output of said displacement blower between the reciprocating engine and ambient air; said reciprocating engine having an intake manifold; said means being comprised of an actuator controlled by the pressure at said intake manifold of said reciprocating engine, said actuator effective to force the entire output of said displacement blower into said reciprocating engine during low load conditions and to divert the entire output of said blower to the ambient air during full load conditions; said actuator operatively constructed to selectively control the output of said blower by means of a throttle valve, said throttle valve being positioned in an exhaust duct positioned between the output of said blower and said reciprocating engine; said throttle valve effective to substantially reduce the power absorbed by said blower during heavy and full load conditions.

9. The combination of a two cycle reciprocating engine, aerodynamic wave machine, and displacement blower; said two cycle reciprocating engine having an input and exhaust manifold, said displacement blower and said wave machine being connected in parallel to supply compressed air to said two cycle reciprocating engine; said aerodynamic wave machine supplying compressed air through said input manifold to said reciprocating engine, the exhaust of said reciprocating engine being supplied to said wave machine through said exhaust manifold; means to selectively control the output of said blower between said reciprocating engine and the ambient air, said means being responsive to the pressure differential between the input and exhaust manifold of said two cycle reciprocating engine.

10. The combination of a two cycle reciprocating engine, aerodynamic wave machine, and displacement blower; said displacement blower and said wave machine being connected in parallel to supply compressed air to said two cycle reciprocating engine; the exhaust of said reciprocating engine being supplied to said wave machine; means to selectively control the output of said blower between said reciprocating engine and the ambient air; said means being comprised of a sensing device and operative as a function of the pressure differential between the output pressure of said wave machine and the exhaust pressure of said reciprocating engine.

11. The combination of a two cycle reciprocating engine, aerodynamic wave machine, and displacement blower; said displacement blower and said wave machine being connected in parallel to supply compressed air to said two cycle reciprocating engine; the exhaust of said reciprocating engine being supplied to said wave machine; means to selectively control the output of said blower between said reciprocating engine and the ambient air; said means being comprised of a sensing device and operative as a function of the pressure differential between the output pressure of said wave machine and the exhaust pressure of said reciprocating engine; said means also containing a throttle valve; said sensing device operatively connected to said throttle valve and operative to close said throttle valve during low load conditions to thereby force the entire output of said displacement blower into said reciprocating engine; said sensing means operatively connected to said throttle valve to open said throttle valve during heavy load conditions to thereby connect the output of said displacement blower to the ambient air, and hence minimize the power absorbed by said displacement blower.

References Cited in the file of this patent
UNITED STATES PATENTS

| | | |
|---|---|---|
| 2,283,694 | Perrine | May 19, 1942 |
| 2,303,714 | Wydler | Dec. 1, 1942 |
| 2,306,277 | Oswald | Dec. 22, 1942 |
| 2,853,987 | Berchtold et al. | Sept. 30, 1958 |